United States Patent
Bish et al.

(10) Patent No.: US 8,280,855 B2
(45) Date of Patent: Oct. 2, 2012

(54) EXTENDED LOGICAL WORM DATA INTEGRITY PROTECTION WITH UNIQUE WORM IDENTIFIER IN HEADER AND DATABASE

(75) Inventors: Thomas William Bish, Tucson, AZ (US); Jonathan Wayne Peake, Tucson, AZ (US); Mark Albert Reid, Tucson, AZ (US); Joseph M Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 12/612,435

(22) Filed: Nov. 4, 2009

(65) Prior Publication Data
US 2011/0107024 A1    May 5, 2011

(51) Int. Cl.
*G06F 17/00* (2006.01)
(52) U.S. Cl. .............. 707/687; 709/228; 360/69; 711/4; 711/103; 711/111; 711/154; 711/156
(58) Field of Classification Search .............. 711/4, 103, 711/111, 154, 156, 163; 360/69; 707/687; 709/228
See application file for complete search history.

(56) References Cited

U.S. PATENT DOCUMENTS

| | | | |
|---|---|---|---|
| 6,842,784 B1 | 1/2005 | Black | 709/225 |
| 6,912,548 B1 | 6/2005 | Black | 707/200 |
| 6,982,846 B2 * | 1/2006 | Jaquette | 360/69 |
| 7,139,871 B2 | 11/2006 | Mizuno | 711/112 |
| 7,162,593 B2 | 1/2007 | Kitamura | 711/154 |
| 2003/0028716 A1 * | 2/2003 | Sved | 711/111 |
| 2006/0277353 A1 | 12/2006 | Mizuno et al. | 711/4 |
| 2008/0250197 A1 * | 10/2008 | Daily et al. | 711/111 |

FOREIGN PATENT DOCUMENTS

| | | |
|---|---|---|
| EP | 1324331 A2 | 2/2003 |
| GB | 2410604 A | 3/2005 |

* cited by examiner

*Primary Examiner* — Hong Kim
(74) *Attorney, Agent, or Firm* — John H. Holcombe

(57) ABSTRACT

A data storage system stores logical data object(s), each identified by a logical identifier. A control is configured to assign a unique WORM (Write Once Read Many) identifier to the logical data object, and stores the unique WORM identifier as associated with the logical identifier, in a database maintained by the control so as to be persistent. Data storage is configured to write the logical data object with a header with the unique WORM identifier. The control, in order to allow the logical data object to be accessed externally to the control, requires matching the unique WORM identifier in the header of a logical data object to the unique WORM identifier of the persistent database for the logical object. The unique WORM identifier is formed of a checksum hash value related to nonce fields comprising at least the logical identifier of the logical data object, an incrementing token, and a time stamp.

22 Claims, 5 Drawing Sheets

EXTENDED LOGICAL WORM DATA INTEGRITY PROTECTION WITH UNIQUE WORM IDENTIFIER IN HEADER AND DATABASE

DOCUMENTS INCORPORATED BY REFERENCE

Commonly assigned U.S. Pat. Nos. 6,982,846 and 7,193,803 are incorporated for their showing of data storage cartridges having rewritable media, but tamper resistant cartridge controlled write once recording thereof. Commonly assigned U.S. Pat. No. 6,339,810 is incorporated for treating rewritable data storage media as write once by automatically advancing a write append limiter and operating the data storage drive to prevent changes to the data occurring before the write append limiter. Commonly assigned application Ser. No. 11/697,004, U.S. Patent Application Publication 2008/0250197, now U.S. Pat. No. 7,774,566, issued Aug. 10, 2010, provides formatting of virtual tape volumes with a virtual tape volume header.

FIELD OF THE INVENTION

This invention relates to data storage with respect to data storage systems, and more particularly to protection of the stored data.

BACKGROUND OF THE INVENTION

Data storage capacities of various media have grown substantially with time, such that a single data storage media is capable of storing many times that of earlier media. One way of handling the data is to have the present media store multiple "logical" units of data that once were the entire capacity of the media. The concept of "logical" units of data is further carried out in the handling of the data in hierarchical data storage servers, where frequently accessed data is stored in faster but expensive memory, and less frequently accessed data is stored in high capacity but slower memory. One example of a fast memory is a direct access storage device (DASD) comprising a disk drive, or a solid state disk (SSD). Examples of high capacity memory are magnetic tape drives or libraries, and disk drive arrays, such as RAID (redundant array of independent disks), or JBOD (just a bunch of disks). Typically, a number of the logical units of data, such as logical volumes, are stored together in the faster memory, and very large numbers of logical units of data are stored together in the slower memory. The logical units of data are typically identified by volume serial numbers (VOLSERs), and may be treated as though they were being stored as "virtual" single data storage media or objects in a "virtual" data storage drive or library, whereas they are actually stored together in files or stacked in physical media.

In some instances, the data being stored is sufficiently important that it is protected from being overwritten or erased and changed or lost. Some data storage media lends itself to protecting the data, such as "read only memory" or ROM, such as ROM optical disks. Other media has an aspect of ROM, such as "Write Once Read Many" or WORM media. The incorporated '846 and '803 patents discuss how rewritable media may be treated as though it were WORM media, where the media, such as a magnetic tape cartridge, comprises two forms of memory, one the media itself, and the other a cartridge memory (CM).

One requirement of WORM media is that different instances of media having data with the same volume serial number must be detectable to protect the integrity of the data against possible malicious behavior. Where the WORM media or media that is treated as though it were WORM is in a physical media object, a world wide name embedded in the media cartridge may be employed to detect when the physical media has been replaced, thus detecting potential malicious behavior. Logical units of data that are virtual objects may be no more than files stored in the faster or slower memories of servers discussed above, and the overall lifecycle of a logical volume may introduce non-protected places where its contents can be compromised. For example, another independent server may write data with the same volume serial number which can get stacked to a physical tape cartridge. If that physical cartridge were to be relabeled and inserted falsely into the original server, its contents, including the stacked logical volume, may go undetected as different. Further, it may be possible that software issues may introduce data anomalies where logical volumes may be replaced with stale versions.

SUMMARY OF THE INVENTION

Methods, server systems, and data storage systems are provided for data integrity protection.

In one embodiment, a data storage system is configured for storing at least one logical data object, the logical data object having a logical identifier. A control is configured to assign a unique WORM (Write Once Read Many) identifier to the logical data object, and to store the unique WORM identifier as associated with the logical identifier, in a database maintained by the control so as to be persistent. Data storage is configured to write the logical data object, identified by the logical identifier, together with a header with the unique WORM identifier. The control, in order to allow the logical data object to be accessed externally to the control, requires matching the unique WORM identifier in the header of a logical data object to the unique WORM identifier of the persistent database for the logical object.

In a further embodiment, the unique WORM identifier is formed of a checksum hash value related to nonce fields comprising at least the logical identifier of the logical data object, an incrementing token, and a time stamp.

In a still further embodiment, the unique WORM identifier is the same length as a WWN (World Wide Name).

In another embodiment, the control is additionally configured to maintain a write-mount count with respect to the logical data object both in the persistent database and the header, and the control, in order to allow the logical data object to be accessed externally to the control, additionally requires the write-mount count of the persistent database to be either equal to or greater by a value of one than the write-mount count of the header.

In a further embodiment, the control is configured to increment the write-mount count each time the logical data object is logically mounted and data is correctly appended to the logical data object.

In a still further embodiment, the logical data object is characterized by the control as a magnetic tape object, wherein the write-mount and the external access each comprises a logical mount of a logical magnetic tape cartridge.

In another embodiment, the control, in response to a failure to match the unique WORM identifier in the header of a logical data object to the unique WORM identifier of the persistent database for the logical object, returns an error with respect to read and with respect to write access to the logical data object by the entity requesting such access, thereby preventing the access and protecting integrity of the logical data object in the data storage system.

In still another embodiment, the persistent database contains metadata with respect to at least one logical data object of at least one data storage media, and the unique WORM identifier for a logical data object is stored with the metadata for the logical data object.

In another embodiment, the control is configured to prevent unintentional overwrite of the database relating to logical objects having unique WORM identifiers, thereby making the database persistent.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
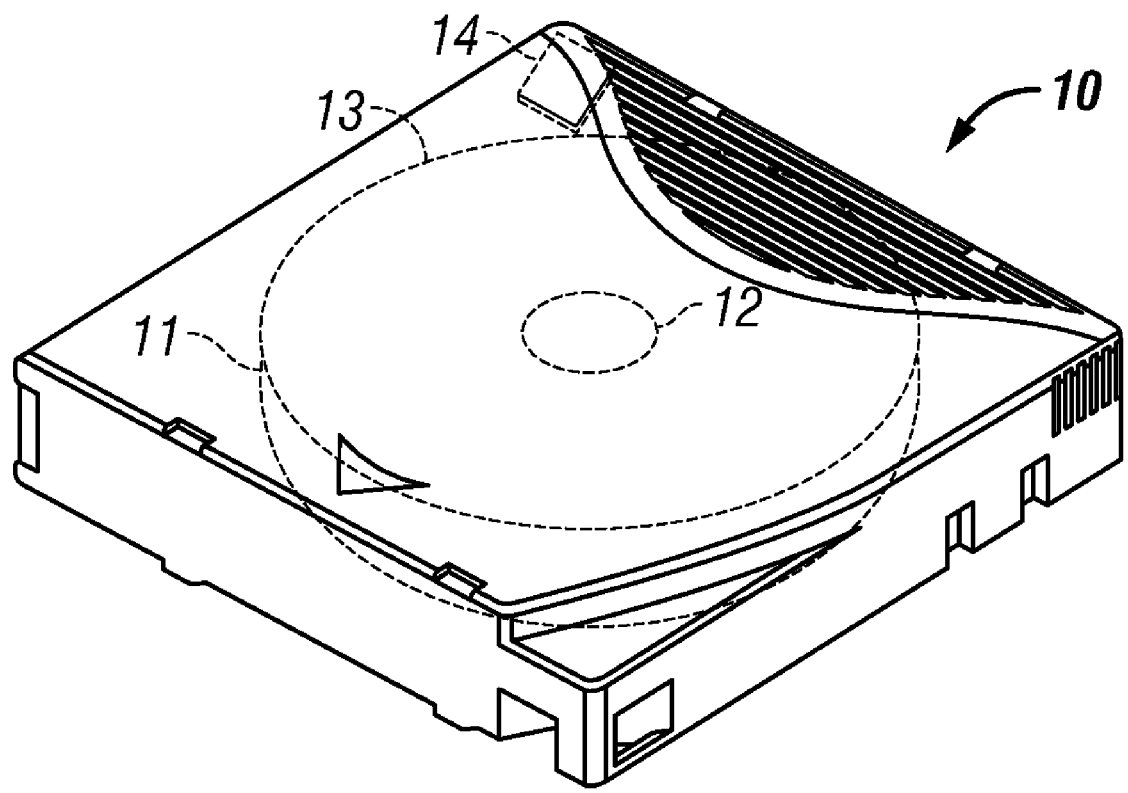
FIG. 1 is an isometric view of a removable data storage cartridge with a media, such as magnetic tape, and with a cartridge memory shown in phantom.

Referring to FIG. 1, an example of a data storage cartridge 10, such as a magnetic tape cartridge, is illustrated which comprises a rewritable magnetic tape 11 wound on a hub 12 of reel 13, and a cartridge memory 14. One example of a magnetic tape cartridge comprises a cartridge based on LTO (Linear Tape Open) technology. The cartridge memory (CM) 14, for example, comprises a transponder having a contactless interface, which is retained in the cartridge 10, for example, by being encapsulated by the cartridge when it is assembled, as is understood by those of skill in the art. The illustrated magnetic tape cartridge is a single reel cartridge. Magnetic tape cartridges may also comprise dual reel cartridges in which the tape is fed between reels of the cartridge. The magnetic tape 11 is typically arranged to store a large number of volumes of data.

In some instances, the data being stored is sufficiently important that it is protected from being overwritten or erased and changed or lost. The incorporated '846 and '803 patents discuss how rewritable media may be treated as though it were WORM media, where the media, such as a magnetic tape cartridge 10, comprises two forms of memory, one the media 11 itself, and the other a cartridge memory 14.

One requirement of WORM media is that different instances of media with the same volume serial number must be detectable to protect the integrity of the data against possible malicious behavior. Where the WORM media or media treated as though it were WORM is in a physical media object, a world wide name embedded in the media cartridge 10 may be employed to detect when the physical media has been replaced, thus detecting potential malicious behavior.

Data is not always stored on a physical media 11 whose replacement in a physical cartridge 10 can be detected. Rather, data storage systems may store data in different forms, such as logical or virtual data, and an example of such a system is illustrated in the data storage system 20 of FIG. 2. Herein, data may be organized in any of various forms, called "volumes" or "objects", the terms chosen without reference to any particular size or arrangement of data.

Figure 2:
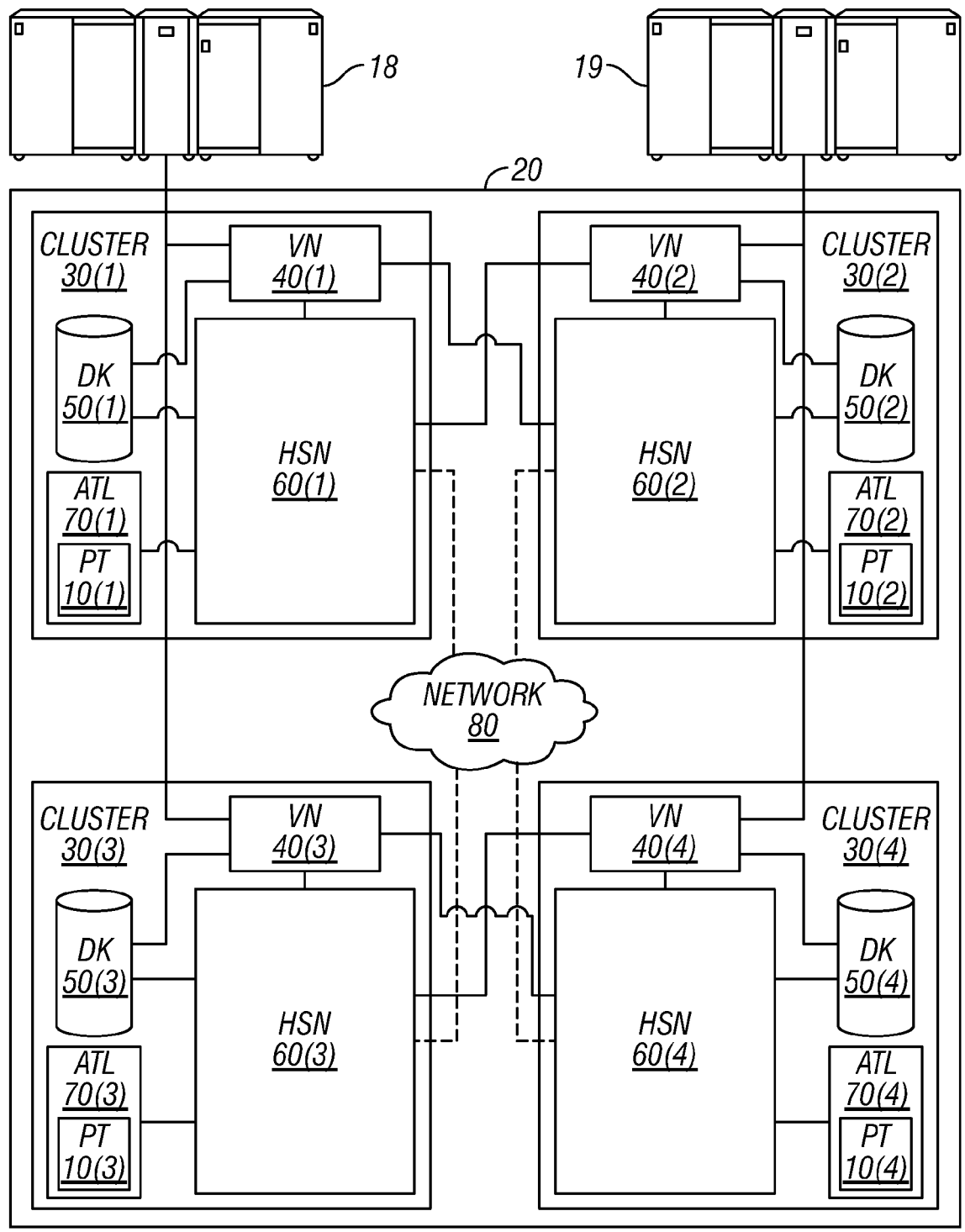
FIG. 2 is a diagrammatic illustration of a data storage system which may implement the present invention.
Figure 3:
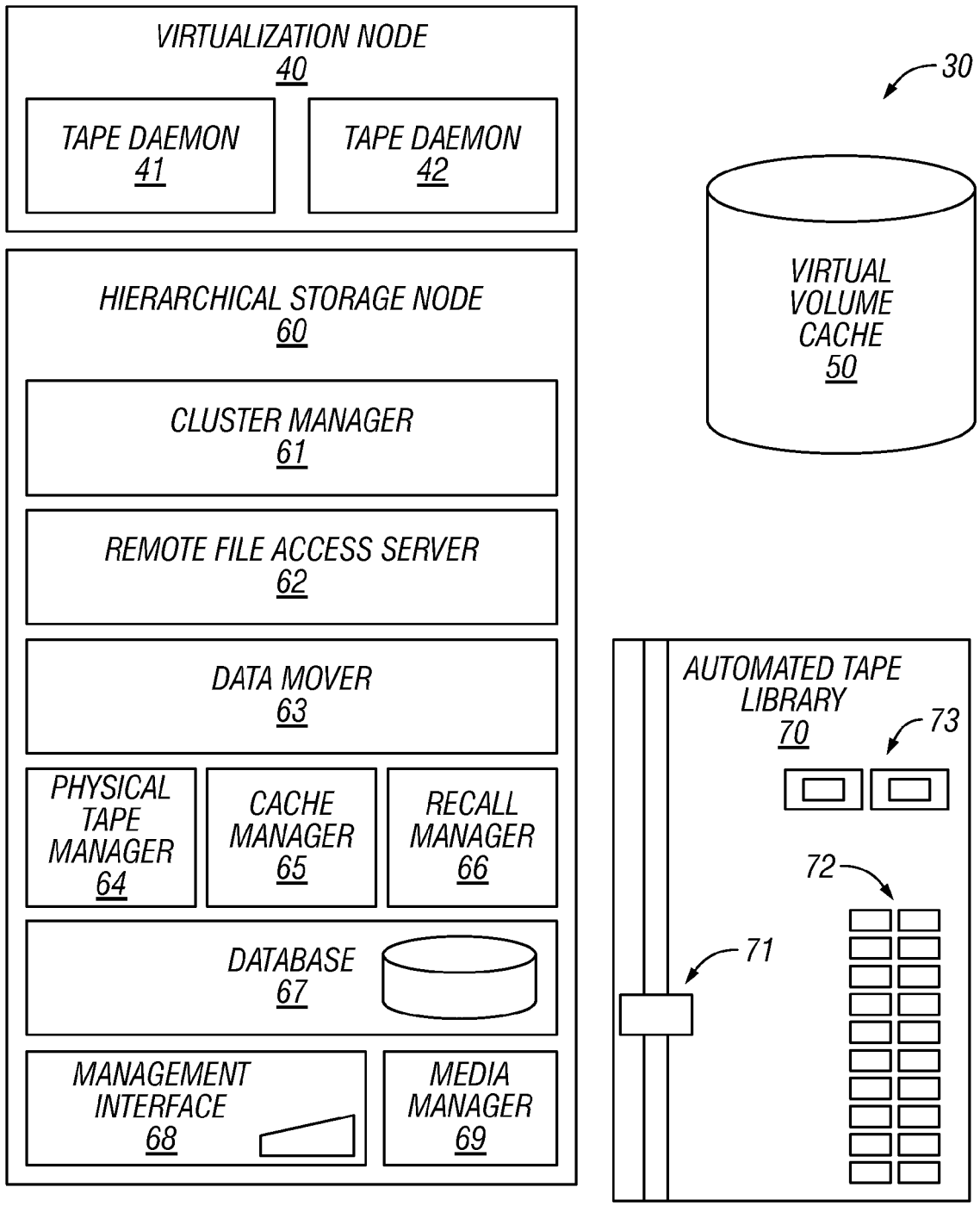
FIG. 3 is a diagrammatic illustration of a server of the data storage system of FIG. 2.

Referring to FIGS. 2 and 3, the data storage system 20 provides storage for a plurality of host systems 18, 19. The data storage system 20, in one embodiment, employs four (4) virtual tape server clusters 30 interconnected by a network 80 with each cluster 30 including a virtualization node ("VN") 40 and a disk storage ("DK") 50 for emulating a tape drive or tape library to hosts 18, 19. Each cluster further comprises a hierarchical storage node ("HSN") 60 for locally moving data between disk storage 50 and an automated tape library ("ATL") 70 as well as remotely moving data between a local disk storage 50 and a remote disk storage. Examples of disk storage comprise one or more disk drives, for example, arranged as a redundant array of independent disks (RAID) or just a bunch of disks (JBOD), or solid state disk (SSD), etc. Herein, a data storage system having both disk storage 50 and an automated tape library 70 is called a "composite library".

In one embodiment, disk storage 50 serves as a virtual volume cache containing logical volumes that emulate data volumes that would be stored on magnetic tape 11 of FIG. 1. Still referring to FIGS. 2 and 3, the logical volumes are stored by disk storage 50 for local and remote access thereto, and library 70 comprises at least one robotic accessor 71 for mounting physical tape cartridges 10, 72 in physical tape drives 73 for access to volumes stored in the physical tape cartridges 10, 72. To this end, virtualization node 40 employs a pair of tape daemons 40 and 41 for operating on virtual volume files residing in either local cache disk storage 50 or a remote cache disk storage as directed by a host system 18, 19, and hierarchical storage node 60 employs a cluster manager 61, a remote file access server 62, a data mover 63, a physical tape manager 64, a cache manager 65, a recall manager 66, a database 67, a management interface 68 and a media manager 69.

Cluster manager 61 coordinates operations between clusters 30 via intercluster tokens that a stored in each cluster's database 67 to determine which cluster 30 has a current copy of data and coordinates copying of data between clusters. Remote file access server 62 provides a link to cache disk storage 50 by a remote cluster. Data mover 63 controls the actual data transfer operations for copies performed between clusters 30 and transfers of data between cache disk storage 50 and library 70.

Physical tape manager 64 manages physical tape volumes in library 70 in multiple physical volume pools, controls reclamation, borrows/returns volumes from a scratch pool, and controls movement of physical tape cartridges 10 and the volumes between pools. Cache manager 65 controls a copying of data volumes between cache disk storage 50 to library 70 and any subsequent removal of a redundant copy of data in cache 50, and provides control signals to balance data flow between cache disk storage 50 and other node 60 components. Recall manager 66 queues and controls recalls of data into cache data storage 50 from library 70 on behalf of virtualization node 40 and cluster manager 61.

Management interface 68 provides information about virtual tape server cluster 30 and may allow a user control and configuration of cluster 30. Media manager 69 manages the handling of physical tape cartridges 10 and error recovery, and diagnoses errors and determines if the errors were caused by a physical tape drive 73 of library 70 or a physical tape media 11 to thereby take appropriate action.

An example of a data storage system 20 which may implement the present invention is discussed in the incorporated '004 Application, and another example comprises the IBM® TS7700 Virtual Tape Server.

Figure 4:
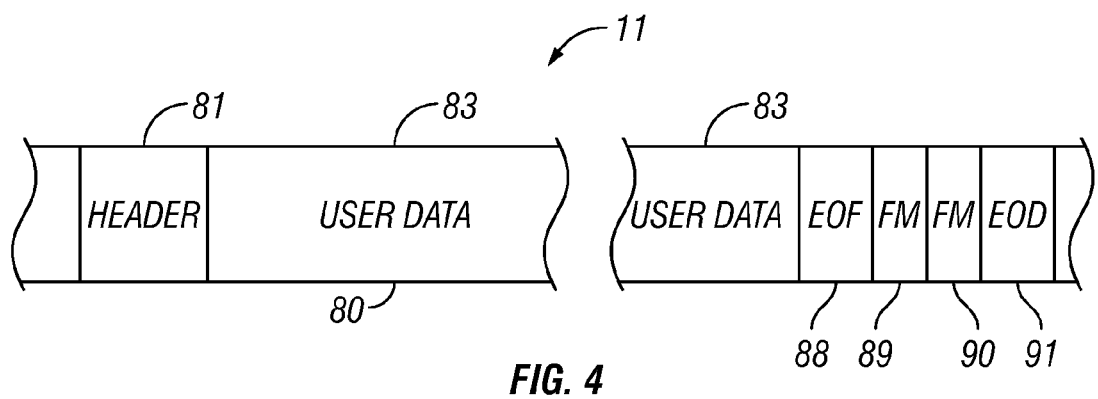
FIG. 4 is a diagrammatic illustration of information of a logical data object.

Referring to FIG. 4, a logical data object or volume 80 comprises data arranged to emulate a data object or volume physically recorded on a magnetic tape 11. A magnetic tape 11 may be organized in many ways. Typically, a magnetic tape is arranged with parallel tracks, and may also be arranged with several parallel wraps of groups of parallel tracks. In one example, the magnetic tape is moved longitudinally in a first direction while a tape head system reads and/or writes data with respect to one wrap, and is reversed to be moved in the opposite direction and the tape head system is shifted to another wrap. A disk drive, in contrast, typically comprises data that is recorded in a serial fashion and is read and/or written by a single head on the surface of a rotating disk. Thus, the data of a disk drive is typically rearranged to a format that matches that of a magnetic tape, and adds information related to the magnetic tape, in order to emulate the data of the magnetic tape.

Typical constructs include a header 81 at the beginning of the volume or object, followed by user data 83. A trailer 88, such as at the end of the volume or object, may indicate the end of a file within the volume or object and, for example, comprises a filemark 89, and the end of the volume or object may comprise a number of additional filemarks 90 and an end of data marker 91.

Operations involving access to logical data objects that are emulating magnetic tape require that the data first be "mounted", to emulate loading and mounting of a magnetic tape in a magnetic tape drive, called herein a logical mount.

As discussed above, the overall lifecycle of a logical volume 80, both as stored in a server and on a physical media, may introduce non-protected places where its contents can be compromised. For example, another independent server may write data with the same volume serial number which can get stacked to a different physical tape cartridge. If that physical cartridge were to be relabeled and inserted falsely into the original server, its contents, including the stacked logical volume, may go undetected as different. Further, it may be possible that microcode issues may introduce data anomalies where logical volumes may be replaced with stale versions.

Referring to FIGS. 2, 3 and 4, a control, such as hierarchical storage node 60, is configured to protect the integrity of data, such as a WORM logical data object, against possible malicious behavior by assigning an unique WORM identifier to a logical data object, and to store the unique WORM identifier as associated with the logical identifier, in a database, such as database 67, maintained by the control so as to be persistent. Data storage, such as virtualization node 40, disk data storage 50, or library 70, is configured to write the logical data object 80, identified by the logical identifier, together with a header 81 with the unique WORM identifier. The control 60, in order to allow the logical data object to be accessed externally to the control, requires matching the unique WORM identifier in the header 81 of a logical data object 80 to the unique WORM identifier of the persistent database 67 for the logical object.

The database 67 may comprise the metadata with respect to the logical data object, and the unique WORM identifier for a logical data object is stored with the metadata for the logical data object.

In one example, the logical identifier of the logical data object is a volume serial no. or "VOLSER".

In one example, the unique WORM identifier is the same length as a WWN (World Wide Name), for example, of 12 bytes.

In order to be "unique", the unique WORM identifier WWN is generated so as to be probabilistically unlikely to be generated twice for the same VOLSER. In one embodiment, the unique WORM identifier is formed of a checksum hash value related to nonce (numbers used once) fields comprising at least the logical identifier (VOLSER) of the logical data object, an incrementing token, and a time stamp. The checksum hash value may, for example, comprise a cryptography checksum hash of greater than 12 bytes, of which the least significant bits are truncated to leave the leftmost significant bits. A specific example comprises a "Message-Digest 5 (MD5)" cryptography checksum 128 bit hash, which is truncated to 96 bits.

An example of the data employed to be the source content fed into the selected checksum algorithm comprises the following 64 byte payload. The table describes the nonce scope of each field to help predict the probability of creating a previously generated value (i.e. collision).

| OFFSET (bytes) | FIELD NAME | DESCRIPTION |
|---|---|---|
| 0:9 | VOLSER | The 10 character ASCII volume serial or VOLSER left aligned and padded with spaces. Nonce Scope: None |
| 10:17 | TOKEN INSERT VERSION | The 64 bit volume token insert version assigned to a logical volume at insert time. Each time a volume is ejected and re-inserted into the same composite library, this value is guaranteed to be different. Volumes with the same VOLSER in different composite libraries can reuse this value. In addition, different VOLSERs in this same library can reuse this value. Nonce Scope: Only within this composite library for the same VOLSER. |
| 18:25 | TOKEN DATA LEVEL CURRENT | The 64 bit data level current prior to first volume expose. For volumes that have been returned to scratch and reused, this value increases sequentially with every write expose operation. Therefore, a subsequent first write to the same volume after it cycles through scratch will result in a unique data level current value that is at least one larger than any previous data level with the same token insert version. This value can reoccur when the token insert version changes. For example, the token insert version and token data level current can be viewed as major and minor values for a volume. Whenever a major value increases, the minor values restart from a fixed value and increase from there. Nonce Scope: Only within this library for a particular token insert version and the same VOLSER. |
| 26:33 | TOKEN DOMAIN LOCK VERSION | The 64 bit value assigned to the token after the mount with write operation completes. Each time a volume's corresponding token is locked for any reason, this 64 bit value increases by one. Therefore, any host access for read or write will increase this value by at least one. Similar to token data level current, this value is a reset minor value off of token insert version. Nonce Scope: Only within this library for a particular token insert version and the same VOLSER. |
| 34:43 | LIBRARY SERIAL | A 10 character ASCII distributed library frame serial number. The value should be right aligned and padded with spaces. |

| OFFSET (bytes) | FIELD NAME | DESCRIPTION |
|---|---|---|
| | | Nonce Scope: World unique for this product based on a manufacturing assigned value for all VOLSERs. |
| 44:51 | TIMESTAMP | 64 bit Timestamp-server clock Nonce Scope: Only within this composite library for this VOLSER since WWID generation is serialized for any volume with the same VOLSER. |
| 52:63 | RESERVE | Reserved for future use. Initialize to zero. |

In the field of cryptography, a cryptography checksum hash is difficult to reproduce when it derives from a modified payload of data. If a payload is maliciously modified, it will be near impossible for the resulting checksum hash that is regenerated to match the originally generated checksum hash. The goal of the present invention is to produce a checksum value that is just as unlikely to be reproduced. However, the payload is not being protected, but, by using nonce fields, the payload is being manipulated to produce a value that is highly unlikely to ever be reproduced. For example, the use of a field that is never likely to occur a $2^{nd}$ time in the payload, such as the timestamp, makes the resulting checksum hash even more unlikely to be produced a second time.

Once the unique WORM identifier is generated and bound to the volume, no algorithm is likely to exist that can identically create the same identifier for the given data object or volume. The unique WORM identifier is one that is probabilistically insignificantly unlikely to be regenerated for the some VOLSER within the same server or library, or any server or library in the world. There is an assumption that if a malicious person was capable of modifying the fields which are used for the payload, then that person has already breached numerous secure interfaces, including direct access to the raw data the checksum hash is attempting to protect in the first place. Therefore, the robustness of the algorithm mainly focuses on unexpected checksum hash collisions in order to leverage or detect flaws in the algorithm itself.

Additional protection comprises maintaining a write-mount count with respect to the logical data object in the header 81, for example as a token, and maintaining the write-mount count in the persistent database 67. The control 60, in order to allow the logical data object 80 to be accessed externally to the control, additionally requires the write-mount count of the persistent database to be either equal to or greater by a value of one than the write-mount count of the header.

In one example, the control 60 is configured to increment the write-mount count each time the logical data object is logically mounted and data is correctly appended to the logical data object. Attempts at incorrect appending of the WORM data will likely cause WORM handling errors to occur. An example of a method to append data to existing WORM data is discussed in the incorporated '810 patent.

Further, where the logical object is characterized by the control as a magnetic tape object, emulating a magnetic tape volume or object, the write-mount and the external access each comprises a logical mount of a logical magnetic tape cartridge, as discussed above.

The reason for having the write-mount count of the persistent database to be either equal to or greater by a value of one than the write-mount count of the header, is to account for any append failure where the device/server/system experiences a failure after the write-mount count is updated for the database 67, but before the header 81 is updated.

Upon a logical mount, if all 12 bytes of the database unique WORM identifier token and the header are not identical, the mount operation for the logical volume is failed, for example, with a mount completion error code. Even if the unique WORM identifier token of the database and the header match, but the write-mount count of the header is not either equal to or greater by a value of one than the write-mount count of the persistent database, the mount operation will also fail with an error code. An override may be provided to account for an unexpected and non-malicious situation, such as during a data restoration procedure.

The database 67 is maintained to be persistent by preventing unintentional overwrite of at least the portion of the database containing the unique WORM identifiers and write-mount counts associated with the logical identifiers of the integrity protected logical data objects.

In order to provide integrity of the WORM data for the data storage system 20 or composite library, the unique WORM identifiers and write-mount counts are synchronized between each of databases 67 for each of the clusters 30, for example, via network 80. Thus, if a WORM logical data object is transferred from one disk storage 50 or library 70 in one cluster, to a disk storage 50 or library 70 in another cluster, either via the network 80 or by transfer of a physical tape 10, the database 67 for that cluster will also provide data integrity with respect to the WORM logical data object, thereby providing data integrity for the entire storage system 20.

Figure 5:
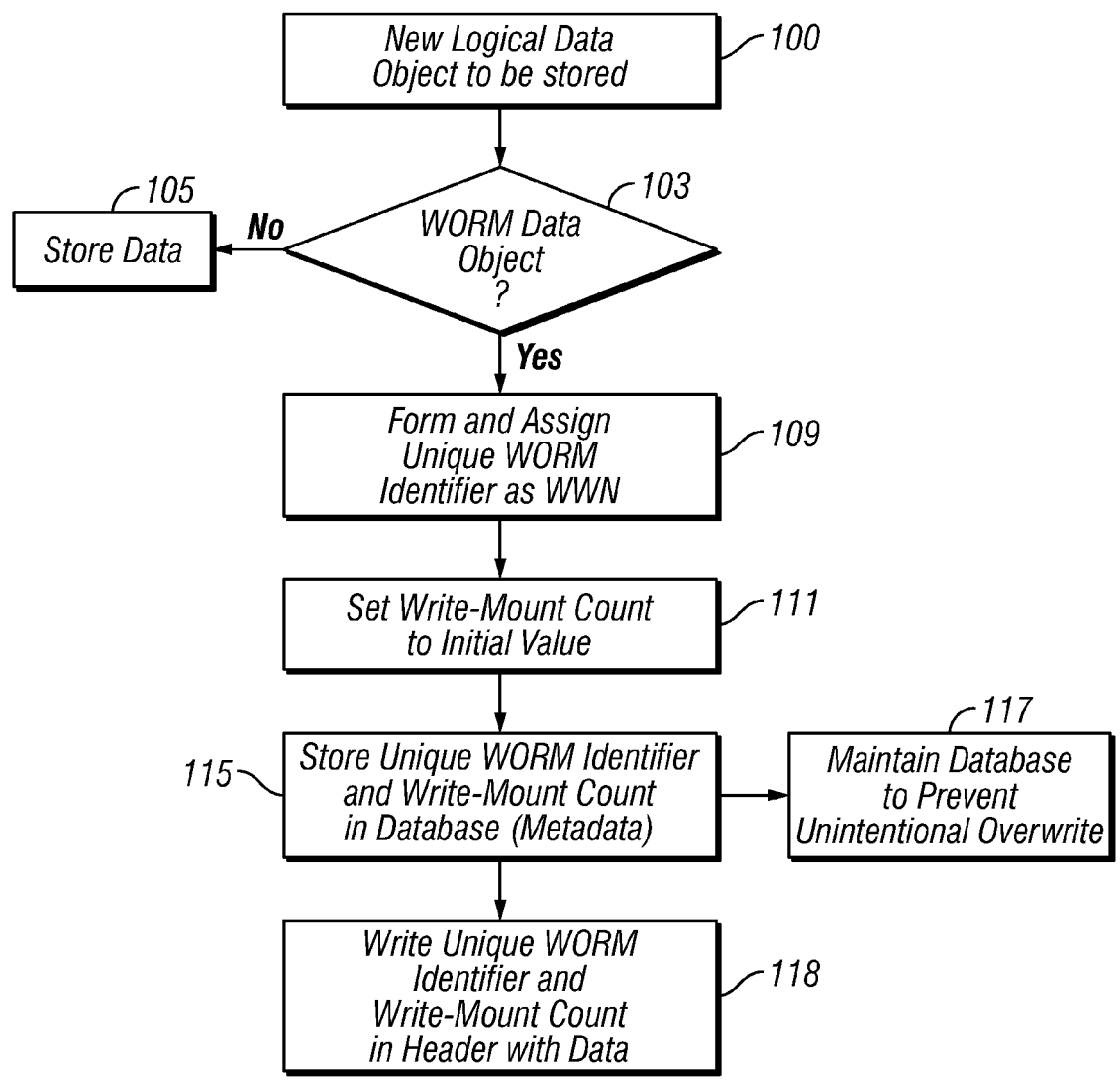
FIGS. 5 and 6 are flow charts depicting exemplary methods of operating the data storage system of FIGS. 2 and 3.
Figure 6:
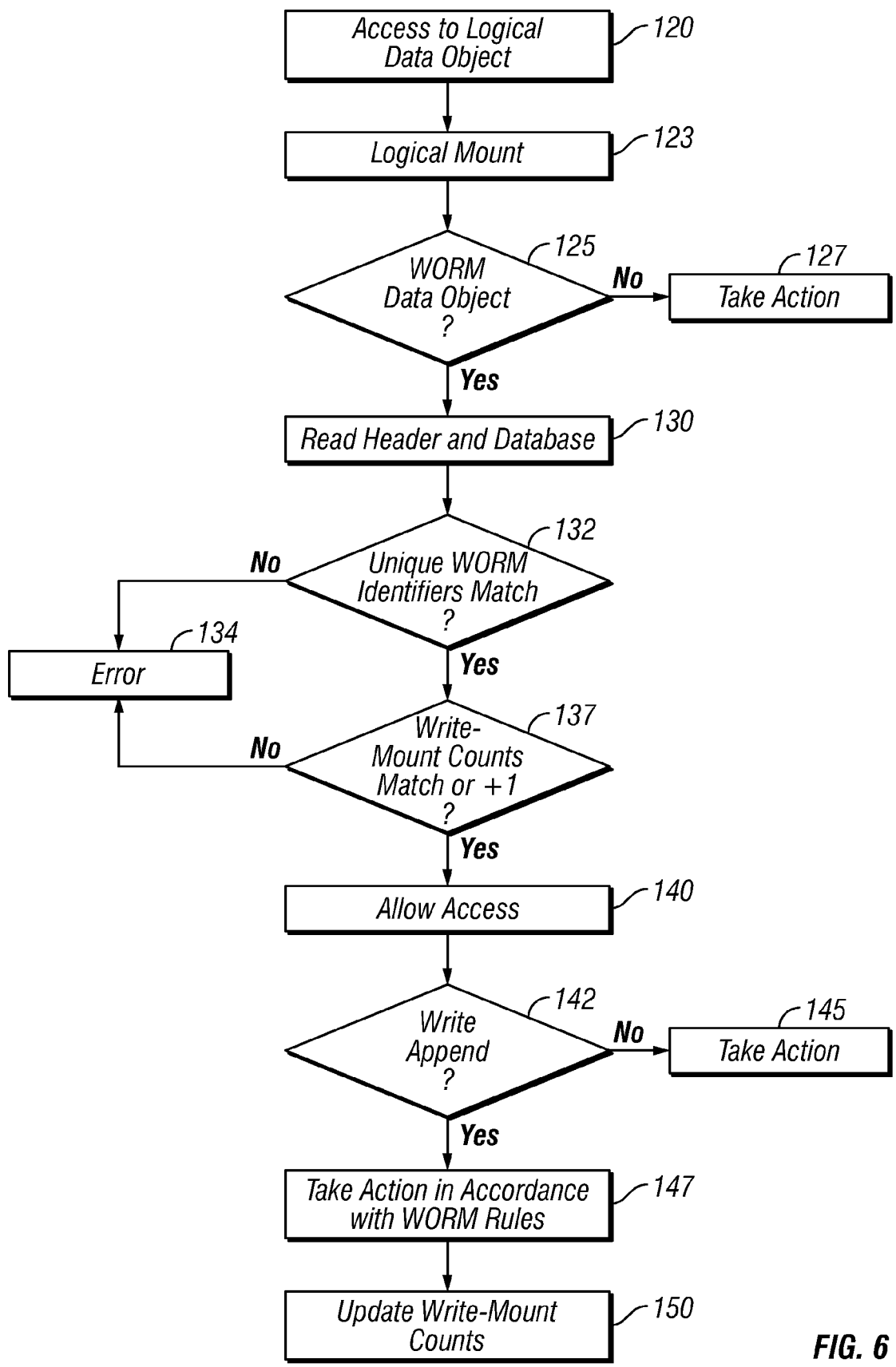

Referring to FIGS. 5 and 6, in step 100, a new logical data object is to be stored by a cluster of the data storage system. The logical data object may have been identified by a logical identifier (VOLSER) assigned by a host system, or a new logical identifier may be assigned in step 100. In step 103, a control determines whether the data object is a WORM data object. If not WORM, the data is stored without integrity protection in step 105.

If the logical data object is WORM, and to be provided integrity protection, a unique WORM identifier is formed and assigned to the logical data object in step 109, as discussed above. In step 111, the write-mount count, discussed above, is set to an initial value. In one example, the initial value may be "1".

In step 115, the assigned unique WORM identifier and the write-mount count are stored in the database as associated with its logical identifier, as discussed above, where the database is maintained so as to be persistent by preventing unintentional overwrite, as illustrated in step 117 and as discussed above.

In step 118, the logical data object, identified by the logical identifier, together with a header with the unique WORM identifier and write-mount count, are written to the data storage, also as discussed above.

Thus, the data storage system establishes the basis to store and provide extended logical WORM data integrity protection to the logical data object(s).

In step 120, a command is received to access at least one logical data object. In one embodiment, where the logical data is emulating a magnetic tape, a logical mount of the data may be conducted in step 123. As discussed above, the logical mount emulates the physical process of loading and mounting of a magnetic tape in a magnetic tape drive, without requiring the time for an actual physical action. The logical mount may occur even if the logical data object is one of the data volumes actually located on a physical magnetic tape cartridge that was previously mounted on a magnetic tape drive.

Step 125 determines, perhaps from the metadata for the logical data object, whether the data is WORM. If not, the action requested in the received command is taken in step 127.

If the logical data object is WORM, in step 130, the control reads the header of the logical data object and the metadata from the database with respect to the logical data object, to obtain the unique WORM indicator and the write-mount count for the logical data object from each.

Step 132 determines whether the unique WORM identifiers from the database and from the header are identical. As discussed above, the unique WORM identifier is highly unlikely to ever be reproduced, and if all 12 bytes of the database unique WORM identifier token and the header are not identical, the mount operation for the logical volume is failed, for example, with a mount completion error code in step 134.

If step 132 determines that the unique WORM identifier from the database and from the header are identical, a match is indicated, and step 137 determines whether the write-mount count of the persistent database is either equal to or greater by a value of one than the write-mount count of the header. If the write-mount count is incorrect, the mount operation will also fail with an error code in step 134.

If steps 132 and 137 determine that the unique WORM identifier from the header and from the database match, and that the write-mount count of the database for the logical data object is either equal to or greater by a value of one than the write-mount count of the header, access to the data is allowed in step 140.

The specific action of the command is determined in step 142. If the action is not a write append, such as a read command, the action occurs in step 145. Since the logical data object is WORM data, if the action is an improper action, such as an overwrite of the data, the WORM rules will prevent the action and signal an error in step 145.

If the action is a write append allowed by the WORM rules, step 147 takes the action in accordance with the WORM rules. There may comprise a number of appends as the result of a single mount as allowed by the WORM rules. Herein, one or more write appends made in accordance with the WORM rules are termed a "correct" write append. Once the write append action(s) are complete, step 150 updates the write-mount count with respect to the logical data object in both the database and the header of the logical data object.

Thus, the data storage system takes the steps to provide extended logical WORM data integrity protection to the logical data object(s).

The implementations may involve software, firmware, micro-code, hardware and/or any combination thereof. Referring to FIG. 3, the implementation may take the form of code or logic implemented in a medium, such as memory, storage and/or circuitry of hierarchical storage node 60, where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk—read only memory [CD-ROM], compact disk—read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A data storage system configured for storing at least one logical data object, said logical data object having a logical identifier, said system comprising:

a control configured to assign an unique WORM (Write Once Read Many) identifier to said logical data object, said unique WORM identifier derived from nonce fields so as to be probabilistically unlikely to be generated twice for a same said logical identifier, and to store said unique WORM identifier as associated with said logical identifier, in a database maintained by said control so as to be persistent;

data storage configured to write said logical data object, identified by said logical identifier, together with a header with said unique WORM identifier;

wherein said control, in order to allow said logical data object to be accessed externally to said control, is configured to require matching said unique WORM identifier in said header of a logical data object to said unique WORM identifier of said persistent database for said logical object; and wherein said unique WORM identifier is formed of a checksum hash value related to said nonce fields comprising at least said logical identifier of said logical data object, an incrementing token, and a time stamp.

2. The data storage system of claim 1, wherein said unique WORM identifier is the same length as a WWN (World Wide Name).

3. The data storage system of claim 1, wherein said control, in response to a failure to match said unique WORM identifier in said header of a logical data object to said unique WORM identifier of said persistent database for said logical object, returns an error with respect to read and with respect to write access to said logical data object by the entity requesting such access, thereby preventing said access and protecting integrity of said logical data object in said data storage system.

4. The data storage system of claim 3, wherein said persistent database contains metadata with respect to at least one logical data object of at least one data storage media, and said unique WORM identifier for a logical data object is stored with said metadata for said logical data object.

5. The data storage system of claim 1, wherein said control is configured to prevent unintentional overwrite of said database relating to logical objects having unique WORM identifiers, thereby making said database persistent.

6. A data storage system configured for storing at least one logical data object, said logical data object having a logical identifier, said system comprising:

a control configured to assign an unique WORM (Write Once Read Many) identifier to said logical data object, and to store said unique WORM identifier as associated with said logical identifier, in a database maintained by said control so as to be persistent; and data storage configured to write said logical data object, identified by said logical identifier, together with a header with said unique WORM identifier;

wherein said control, in order to allow said logical data object to be accessed externally to said control, is configured to require matching said unique WORM identifier in said header of a logical data object to said unique WORM identifier of said persistent database for said logical object;

wherein said unique WORM identifier is formed of a checksum hash value related to nonce fields comprising at least said logical identifier of said logical data object, an incrementing token, and a time stamp; and wherein said control is additionally configured to maintain a write-mount count with respect to said logical data object in said persistent database and in said header, and said control, in order to allow said logical data object to be accessed externally to said control, is additionally configured to require said write-mount count of said persistent database to be either equal to or greater by a value of one than said write-mount count of said header.

7. The data storage system of claim 6, wherein said control is configured to increment said write-mount count each time said logical data object is logically mounted and data is correctly appended to said logical data object.

8. The data storage system of claim 6, wherein said at least one logical object is characterized by said control as a magnetic tape object, and wherein said write-mount and said external access each comprises a logical mount of a logical magnetic tape cartridge.

9. A method for storing at least one logical data object, said logical data object having a logical identifier, comprising:
assigning a unique WORM (Write Once Read Many) identifier to said logical data object, said unique WORM identifier derived from nonce fields so as to be probabilistically unlikely to be generated twice for a same said logical identifier;
storing said unique WORM identifier as associated with said logical identifier, in a database maintained so as to be persistent;
writing said logical data object, identified by said logical identifier, together with a header with said unique WORM identifier, to data storage;
requiring a match of said unique WORM identifier in said header of a logical data object to said unique WORM identifier of said persistent database for said logical object in order to allow said logical data object to be accessed; and
wherein said unique WORM identifier is formed of a checksum hash value related to said nonce fields comprising at least said logical identifier of said logical data object, an incrementing token, and a time stamp.

10. The method of claim 9, wherein said unique WORM identifier is the same length as a WWN (World Wide Name).

11. The method of claim 9, comprising the step of, in response to a failure to match said unique WORM identifier in said header of a logical data object to said unique WORM identifier of said persistent database for said logical object, returning an error with respect to read and with respect to write access to said logical data object by the entity requesting such access, thereby preventing said access and protecting integrity of said logical data object in said data storage system.

12. The method of claim 11, wherein said persistent database contains metadata with respect to at least one logical data object of at least one data storage media, and said unique WORM identifier for a logical data object is stored with said metadata for said logical data object.

13. The method of claim 9, comprising the step of preventing unintentional overwrite of said database relating to logical objects having unique WORM identifiers, thereby making said database persistent.

14. A method for storing at least one logical data object, said logical data object having a logical identifier, comprising:
assigning a unique WORM (Write Once Read Many) identifier to said logical data object;
storing said unique WORM identifier as associated with said logical identifier, in a database maintained so as to be persistent;
writing said logical data object, identified by said logical identifier, together with a header with said unique WORM identifier, to data storage; and
requiring a match of said unique WORM identifier in said header of a logical data object to said unique WORM identifier of said persistent database for said logical object in order to allow said logical data object to be accessed;
wherein said unique WORM identifier is formed of a checksum hash value related to nonce fields comprising at least said logical identifier of said logical data object, an incrementing token, and a time stamp; and
maintaining a write-mount count with respect to said logical data object in said persistent database and in said header; and requiring said write-mount count of said persistent database to be either equal to or greater by a value of one than said write-mount count of said header in order to allow said logical data object to be accessed externally.

15. The method of claim 14, wherein said step of incrementing said write-mount count comprises incrementing said write-mount count each time said logical data object is logically mounted and data is correctly appended to said logical data object.

16. The method of claim 14, wherein said at least one logical data object is characterized by said control as a magnetic tape object, and wherein said write-mount and said external access each comprises a logical mount of a logical magnetic tape cartridge.

17. A server, comprising:
a processor; and
a memory configured for storing instructions operable with said processor, the instructions executable for storing at least one logical data object, said logical data object having a logical identifier, said instructions operating said processor to:
assign a unique WORM (Write Once Read Many) identifier to said logical data object, said unique WORM identifier derived from nonce fields so as to be probabilistically unlikely to be generated twice for a same said logical identifier;
store said unique WORM identifier as associated with said logical identifier, in a database;
prevent unintentional overwrite of said database relating to logical objects having unique WORM identifiers, thereby making said database persistent;
write said logical data object, identified by said logical identifier, together with a header with said unique WORM identifier, to data storage;
require a match of said unique WORM identifier in said header of a logical data object to said unique WORM identifier of said persistent database for said logical object in order to allow said logical data object to be accessed externally to said server; and
wherein said unique WORM identifier is formed of a checksum hash value related to said nonce fields comprising at least said logical identifier of said logical data object, an incrementing token, and a time stamp.

18. The server of claim 17, wherein said instructions additionally are for operating said processor to, in response to a failure to match said unique WORM identifier in said header of a logical data object to said unique WORM identifier of said persistent database for said logical object, return an error with respect to read and with respect to write access to said logical data object by the entity requesting such access, thereby preventing said access and protecting integrity of said logical data object in said data storage system.

19. The server of claim 18, wherein said persistent database contains metadata with respect to at least one logical data object of at least one data storage media, and said unique WORM identifier for a logical data object is stored with said metadata for said logical data object.

20. A server, comprising:
a processor; and
a memory configured for storing instructions operable with said processor, the instructions executable for storing at least one logical data object, said logical data object having a logical identifier, said instructions operating said processor to:
assign a unique WORM (Write Once Read Many) identifier to said logical data object;
store said unique WORM identifier as associated with said logical identifier, in a database;
prevent unintentional overwrite of said database relating to logical objects having unique WORM identifiers, thereby making said database persistent;
write said logical data object, identified by said logical identifier, together with a header with said unique WORM identifier, to data storage;
require a match of said unique WORM identifier in said header of a logical data object to said unique WORM identifier of said persistent database for said logical object in order to allow said logical data object to be accessed externally to said server;
wherein said unique WORM identifier is formed of a checksum hash value related to nonce fields comprising at least said logical identifier of said logical data object, an incrementing token, and a time stamp; and
wherein said instructions additionally are for operating said processor to maintain a write-mount count with respect to said logical data object in said persistent database and in said header; and to require said write-mount count of said persistent database to be either equal to or greater by a value of one than said write-mount count of said header in order to allow said logical data object to be accessed externally to said control.

21. The server of claim 20, wherein said instruction for incrementing said write-mount count comprises incrementing said write-mount count each time said logical data object is logically mounted and data is correctly appended to said logical data object.

22. The server of claim 20, wherein said at least one logical data object is characterized by said server as a magnetic tape object, and wherein said write-mount and said external access each comprises a logical mount of a logical magnetic tape cartridge.

* * * * *